Sept. 25, 1934.   C. BEAN   1,974,443
PIE PAN
Filed Feb. 23, 1934

Inventor
*Carolina Bean*

By *John W. Maupin*
Attorney

Patented Sept. 25, 1934

1,974,443

UNITED STATES PATENT OFFICE 1,974,443

PIE PAN

Carolina Bean, Seattle, Wash.

Application February 23, 1934, Serial No. 712,596

1 Claim. (Cl. 53—6)

My invention relates to pie plates, and the principal objects of the invention are to provide a pie plate comprising means for preventing overflow of the crust and ingredients of a pie around the outer edges of the plate, means for forming the outer edge of a pie crust, and means for trimming the outer edge of a pie crust.

Figure 1:
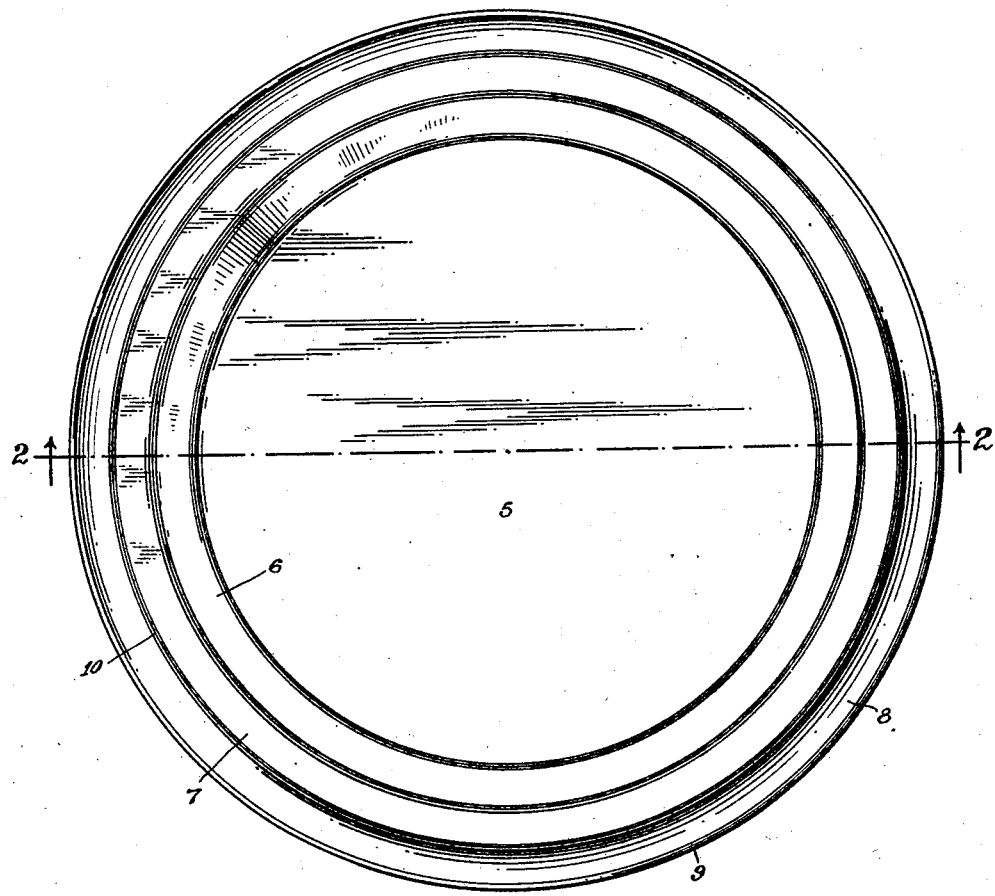
Figure 2:
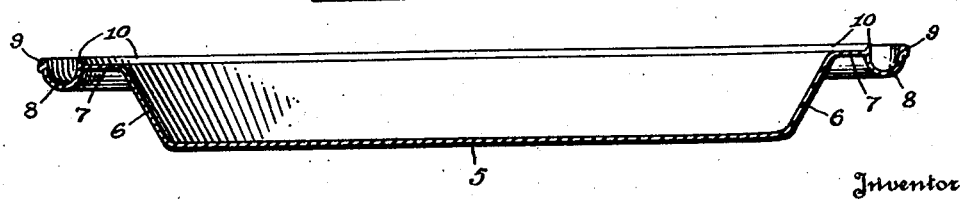

With the above and other objects in view which will appear as the description proceeds, the invention consists of the novel construction, adaptation, combination and arrangement of parts hereinafter described and claimed. These objects are accomplished by devices illustrated in the accompanying drawing; wherein:

Figure 1 is a top plan view of a pie plate embodying the features of the invention; and Fig. 2 is a view in central vertical section of the same taken on a broken line 2—2 of Fig. 1.

Referring to the drawing throughout which like reference numerals indicate like parts, the numeral 5 designates the bottom of a pie plate and the numeral 6 designates its slanting sides. At the top of the slanting sides the plate extends outwardly to form an annular flange 7 that is parallel with the bottom 5. At the outer edge of said flange the plate is depressed to form a rounded annular trough 8 whose outer edge is provided with a stiffener bead 9. At the point where said trough joins the flange 7 a sharp upstanding annular cutting edge 10 is formed.

In the use of my pie plate, ordinarily the rim or outer flange of a pie crust will extend along the flange portion 7 of the plate and its outer edge will terminate against and be confined by the cutting edge 10 thus forming a neat smooth edge around the pie crust when the pie is baked. Before baking, if the outer edge of the crust should overlap the cutting edge 10 it may be trimmed off by pressing it down against the cutting edge as will be understood.

Heretofore, in baking a pie in an ordinary pie plate, the outer edge of the pie crust together with some of the stick ingredients have been caused to overflow around the outer edge of the pie plate and fall upon the floor of the oven thus causing a very undesirable condition. In the use of my device, the annular trough 8 will catch and retain all overflow material thus eliminating this undesirable feature. Furthermore, the edge portion of the crust which, in baking, has been caused to extend over into the annular trough may be readily trimmed off by pressing it down upon the cutting edge 10 thus leaving a smooth outer edge around the pie crust, and the overflow material may be readily removed from the annular trough.

Having thus described my invention, what I claim and desire to secure by Letters Patent of the United States is:

In a pie plate comprising a bottom and slanting sides, the combination of an annular flange extending outwardly from the top of the sides and in parallel relation with the bottom of the plate, a rounded, depressed trough formed around the outer edge of said annular flange, and an annular upstanding cutting edge formed at the joining point of the flange and trough.

CAROLINA BEAN.